United States Patent [19]
Taniguchi et al.

[11] Patent Number: 5,804,900
[45] Date of Patent: Sep. 8, 1998

[54] MAGNETIC BEARING SPINDLE DEVICE

[75] Inventors: Manabu Taniguchi, Yamatotakada; Hirochika Ueyama, Hirakata, both of Japan

[73] Assignee: Koyo Seiko Co., Ltd., Osaka, Japan

[21] Appl. No.: 776,067
[22] PCT Filed: Jul. 18, 1995
[86] PCT No.: PCT/JP95/01425
  § 371 Date: Jan. 17, 1997
  § 102(e) Date: Jan. 17, 1997
[87] PCT Pub. No.: WO96/02353
  PCT Pub. Date: Feb. 1, 1996

[30] Foreign Application Priority Data

Jul. 20, 1994 [JP] Japan ................................ 6-167629

[51] Int. Cl.$^6$ .............................. H02K 7/09; B23Q 11/10
[52] U.S. Cl. ........................................... 310/90.5; 310/61
[58] Field of Search ............................ 310/90.5, 60 A, 310/61, 54; 451/24, 294

[56] References Cited

U.S. PATENT DOCUMENTS

| | | | |
|---|---|---|---|
| 1,912,586 | 6/1933 | Lysholm | 310/61 |
| 3,260,872 | 7/1966 | Potter | 310/61 |
| 3,577,024 | 5/1971 | Inagaki et al. | 310/61 |
| 3,733,502 | 5/1973 | Curtis et al. | 310/61 |
| 4,180,946 | 1/1980 | Heijkenskjold et al. | 310/90.5 |
| 4,382,638 | 5/1983 | Andoh et al. | 451/24 |
| 4,389,849 | 6/1983 | Gasser et al. | 310/15 |
| 4,976,177 | 12/1990 | Fouche | 451/24 |
| 5,027,280 | 6/1991 | Ando et al. | 310/90.5 |
| 5,130,585 | 7/1992 | Iwamatsu et al. | 310/59 |
| 5,347,188 | 9/1994 | Iseman et al. | 310/68 D |
| 5,365,133 | 11/1994 | Raad | 310/68 D |

FOREIGN PATENT DOCUMENTS

| | | | |
|---|---|---|---|
| 0315469 | 5/1989 | European Pat. Off. | |
| 0455452 | 11/1991 | European Pat. Off. | |
| 63-174846 | 7/1988 | Japan | B23Q 11/00 |
| 3-228570 | 10/1991 | Japan | B24B 41/04 |
| 06170690 | 6/1994 | Japan. | |
| 95/02270 | 1/1995 | WIPO | 310/90.5 |

*Primary Examiner*—Steven L. Stephan
*Assistant Examiner*—B. Mullins
*Attorney, Agent, or Firm*—Reid & Priest LLP

[57] ABSTRACT

A spindle 2 is formed with a cooling-working fluid channel 19 axially extending therethrough. A housing 1 has fixed to the rear end thereof a tubular cooling-working fluid supply member 29 inserted in the fluid channel 19 with a clearance formed therearound. The radial spacing between the outer peripheral surface of the supply member 29 and the spindle inner peripheral surface defining the fluid channel 19 is made greater than the radial spacing between touchdown bearings 9 and the spindle 2 as supported contactlessly. The inner peripheral surface defining the fluid channel 19 is formed, over a range extending from the rear end of the channel and greater than the depth of insertion of the supply member 29, with helical grooves 21 for sending a cooling-working fluid forward when the spindle 2 is in rotation. A working fluid reservoir 32 communicating with the clearance between the spindle 2 and the supply member 29 is formed in a rear end interior portion of the housing 1. Drain ports 33 are formed in the housing 1 in communication with the reservoir 32. A labyrinth seal 28 is formed between the housing 1 and the spindle 2 for providing a seal between the housing interior portion formed with the reservoir 32 and a portion to the front of the interior portion. Consequently, the entire spindle device is prevented from malfunctioning.

14 Claims, 3 Drawing Sheets

1

MAGNETIC BEARING SPINDLE DEVICE

TECHNICAL FIELD

The present invention relates to magnetic bearing spindle devices for use as machine tools.

Throughout the specification, the term "front" refers to the left-hand side of each of the drawings, and the term "rear" to the opposite side thereof.

BACKGROUND ART

The spindle devices for use as machine tools include antifriction bearing spindle devices in addition to magnetic bearing spindle devices. Magnetic bearing spindle devices comprise as arranged within a housing a spindle, motor, radial magnetic bearings, an axial magnetic bearing, radial sensors, an axial sensor and touchdown bearings. The spindle is adapted to be supported contactlessly by the radial magnetic bearings and the axial magnetic bearing relative to the housing. Antifriction bearing spindle devices comprise a spindle, motor and antifriction bearings which are arranged with a housing. The spindle is rotatably supported by the antifriction bearings relative to the housing. Magnetic bearing spindle devices have the advantages over antifriction bearing spindle devices that the spindle can be greater in diameter, given higher rigidity and driven at a higher speed with a diminished bearing loss.

For some kinds of work, there arises a need to apply a cooling-working fluid to the workpiece from the front end of the spindle for cooling the workpiece and the tool. To fulfill the need, an antifriction bearing spindle device is proposed which has a cooling-working fluid channel extending through the spindle axially thereof, and a tubular cooling-working fluid supply member fixed to the rear end of the housing and connected to the spindle by a rotary joint. The rotary joint comprises a pipe member attached to the rear end of the spindle and housed in an outer frame fixed to the supply member, and an annular seal member fitted in a clearance between the pipe member and the outer frame to provide a sealed structure. In the case of the antifriction bearing spindle device, the spindle is always in a fixed position radially thereof, so that the cooling-working fluid can be readily prevented from leaking from the joint of the fluid supply member and the spindle in the manner described as by an oil seal. Moreover, the working fluid, even if leaking in a small amount, will produce no adverse effect on the entire device.

With the magnetic bearing spindle device, however, the spindle at a halt differs from the spindle in operation in its position with respect to the radial and axial directions. Accordingly, even if the spindle has a cooling-working fluid channel extending axially therethrough, with a tubular cooling-working fluid supply member fixed to the rear end of the housing, the spindle can not be connected to the fluid supply member by a rotary joint. Since sealing means of the contact type, if used, fails to permit high-speed rotation of the spindle, it appears possible to insert the fluid supply member into the fluid channel of the spindle with a clearance formed around the member, whereas it is then impossible to completely prevent leakage of the working fluid. Furthermore, leakage of the working fluid, if occurring, gives rise to an insulation failure especially when the fluid is soluble in water, causing damage to the motor, magnetic bearing, sensor or the like and leading to a malfunction of the entire magnetic bearing spindle device.

An object of the present invention is to provide a magnetic bearing spindle device free of the foregoing problems.

DISCLOSURE OF THE INVENTION

The present invention provides a magnetic bearing spindle device which comprises a spindle disposed within a housing, magnetic bearings for contactlessly supporting the spindle relative to the housing while the spindle is in rotation, and mechanical touchdown bearings for supporting the spindle in contact therewith when the spindle is initiated into rotation and when the spindle is brought to a halt, the magnetic bearing spindle device being characterized in that the spindle is formed with a cooling-working fluid channel extending axially therethrough.

When a cooling-working fluid is supplied to the fluid channel of the spindle thus constructed, the fluid is sent forward through the channel and applied to a workpiece from a tool attached to the front end of the spindle. Accordingly, the magnetic bearing spindle device having various advantages over the antifriction bearing spindle device is also so adapted that the workpiece and the tool can cooled.

The spindle of the device may have an inner peripheral surface defining the cooling-working fluid channel and formed with a helical groove for sending the cooling-working fluid forward when the spindle is in rotation.

The cooling-working fluid can then be sent forward by the rotation of the spindle reliably.

A tubular cooling-working fluid supply member may be fixed to a rear end of the housing and inserted in the fluid channel of the spindle with a clearance formed in the channel around the fluid supply member, and a radial spacing formed between an outer peripheral surface of the fluid supply member and an inner peripheral surface of the spindle defining the fluid channel may be greater than a radial spacing between the touchdown bearing and the spindle as contactlessly supported.

The cooling-working fluid can then be supplied to the fluid channel of the spindle through the fluid supply member. If the radial spacing between the outer periphery of the fluid supply member and the channel-defining inner periphery of the spindle is made greater than the radial spacing between the touchdown bearing and the spindle as contactlessly supported, contact or interference between the spindle and the fluid supply member can be precluded when the spindle shifts radially and axially thereof upon a change-over of the device from operation to a halt and vice versa.

When the magnetic bearing spindle device has the cooling-working fluid supply member as described above, the housing is preferably formed in an interior rear portion thereof with a working fluid reservoir in communication with the clearance in the spindle around the fluid supply member, with a drain port formed in the housing in communication with the fluid reservoir. When the cooling-working fluid leaks rearward from the clearance, the leaking fluid is collected in the reservoir and drawn off through the drain port.

With the magnetic bearing spindle device having the working fluid reservoir and the drain port formed in the housing and communicating with the fluid reservoir as described above, the device preferably has seal means between the housing and the spindle for providing a seal between the housing interior portion formed with the fluid reservoir and a portion to the front of the interior portion. Preferably, the seal means is a labyrinth seal provided between the housing and the spindle. The cooling-working fluid collected in the reservoir is then prevented from flowing into the portion to the front of the reservoir.

Consequently, the motor, magnetic bearing, sensor or the like which is present in the portion to the front of the reservoir is protected from damage due, for example, to an insulation failure, whereby the device is prevented in its entirety from malfunctioning.

With the magnetic bearing spindle device having the cooling-working fluid supply member as described above, the channel-defining inner peripheral surface of the spindle may be formed, over a range extending from a rear end of the spindle and greater than the depth of insertion of the fluid supply member, with a helical groove for sending the cooling-working fluid forward when the spindle is in rotation. The cooling-working fluid is then reliably sent forward by the rotation of the spindle and inhibited from leaking rearward from the clearance within the spindle around the fluid supply member.

With the magnetic bearing spindle device having the cooling-working fluid supply member as described above, the channel-defining inner peripheral surface of the spindle may be formed with a helical groove for sending the cooling-working fluid forward when the spindle is in rotation, and the portion of the fluid supply member inserted in the fluid channel of the spindle may be formed in the outer peripheral surface thereof with a helical groove different in twisting direction from the helical groove formed in the channel-defining inner peripheral surface of the spindle. Both the helical grooves then act to more reliably inhibit the cooling-working fluid from flowing rearward between the fluid supply member and the spindle during the rotation of the spindle.

The magnetic bearing spindle device described may comprise a radial magnetic bearing disposed between the housing and the spindle at each of two locations spaced apart axially of the spindle, an axial magnetic bearing disposed between the housing and an outer flange fixedly provided on the spindle, radial sensors for detecting the radial position of the spindle, an axial sensor for detecting the axial position of the spindle, and a magnetic bearing control circuit for supplying current to the radial magnetic bearings and the axial magnetic bearing based on position detecting signals from the radial sensors and the axial sensor.

In this case, the axial magnetic bearing and a motor for drivingly rotating the spindle may be arranged between the two radial magnetic bearings. The touchdown bearings may be arranged outwardly of the two radial magnetic bearings with respect to the axial direction of the spindle. Should the working fluid leak rearward between the spindle and the fluid supply member in this case, the touchdown bearing itself serves as a barrier, while the clearance between the spindle and the touchdown bearing acts as a labyrinth seal to prevent the cooling-working fluid from flowing to the locations of the radial magnetic bearings and the axial magnetic bearing.

BEST MODE OF CARRYING OUT THE INVENTION

The most preferred embodiment of the invention will be described below with reference to the drawings.

Figure 1:
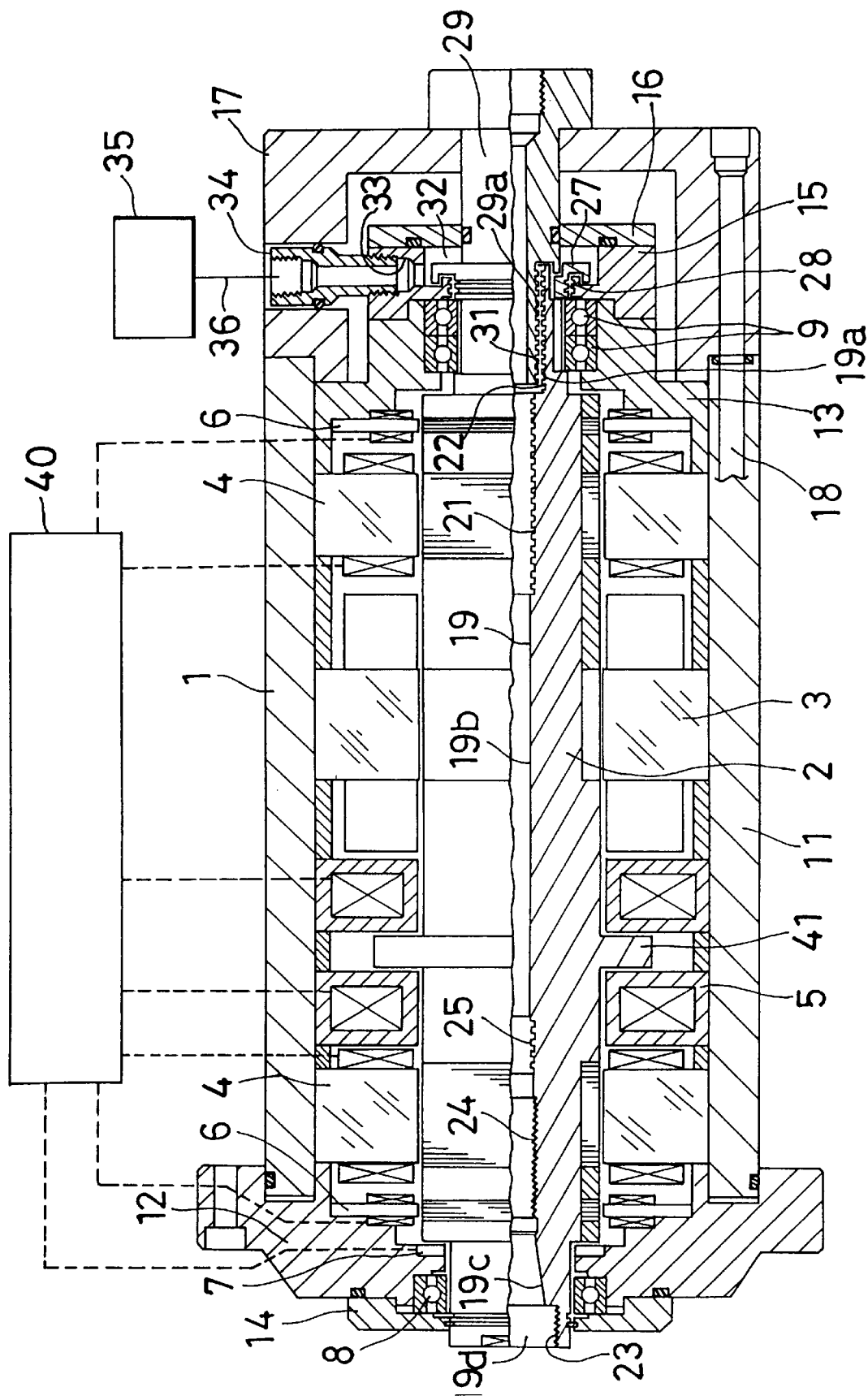
FIG. 1 is a view in longitudinal section showing the overall construction of a magnetic bearing spindle device embodying the invention.
Figure 2:
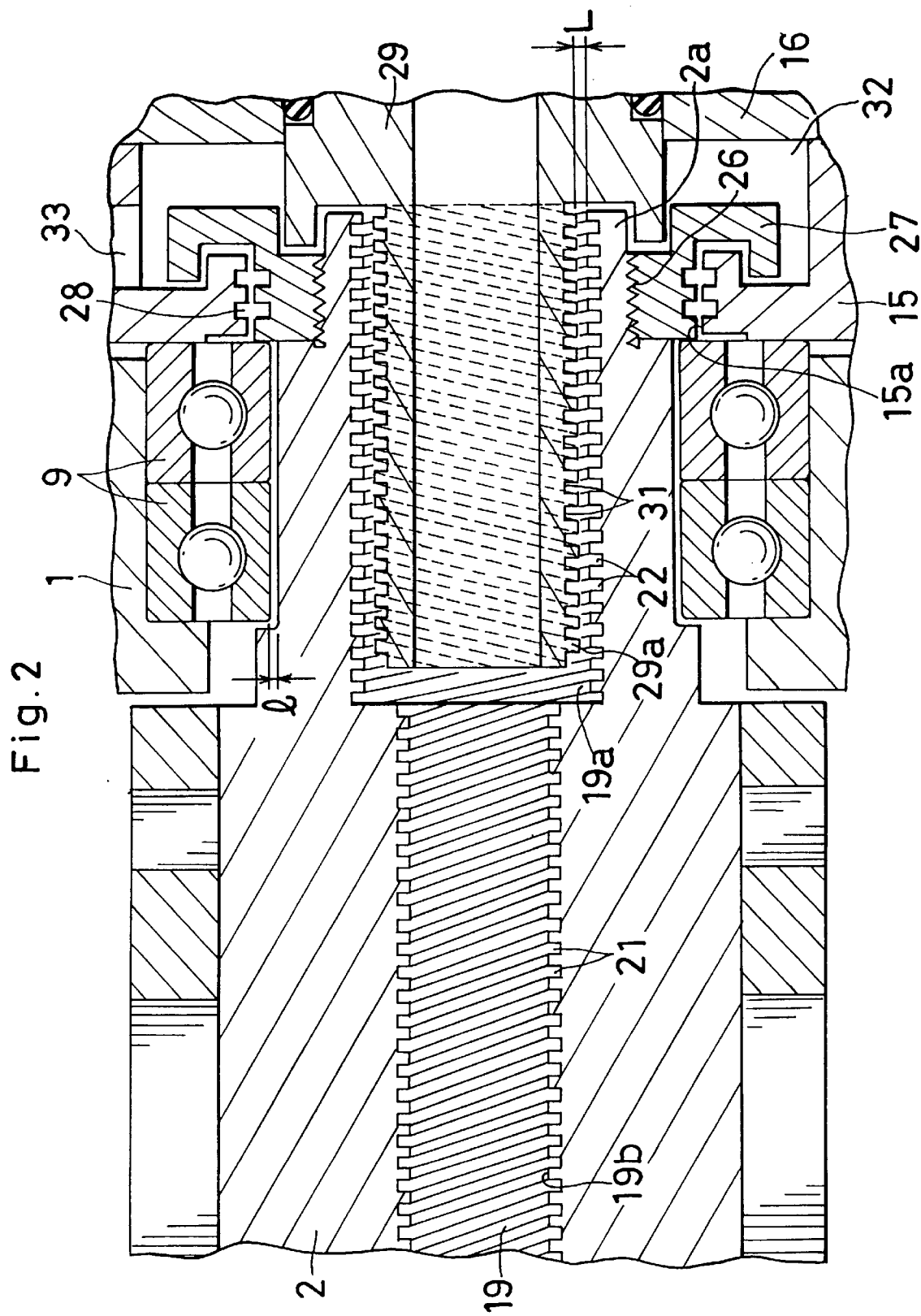
FIG. 2 is an enlarged fragmentary view of FIG. 1.
Figure 3:
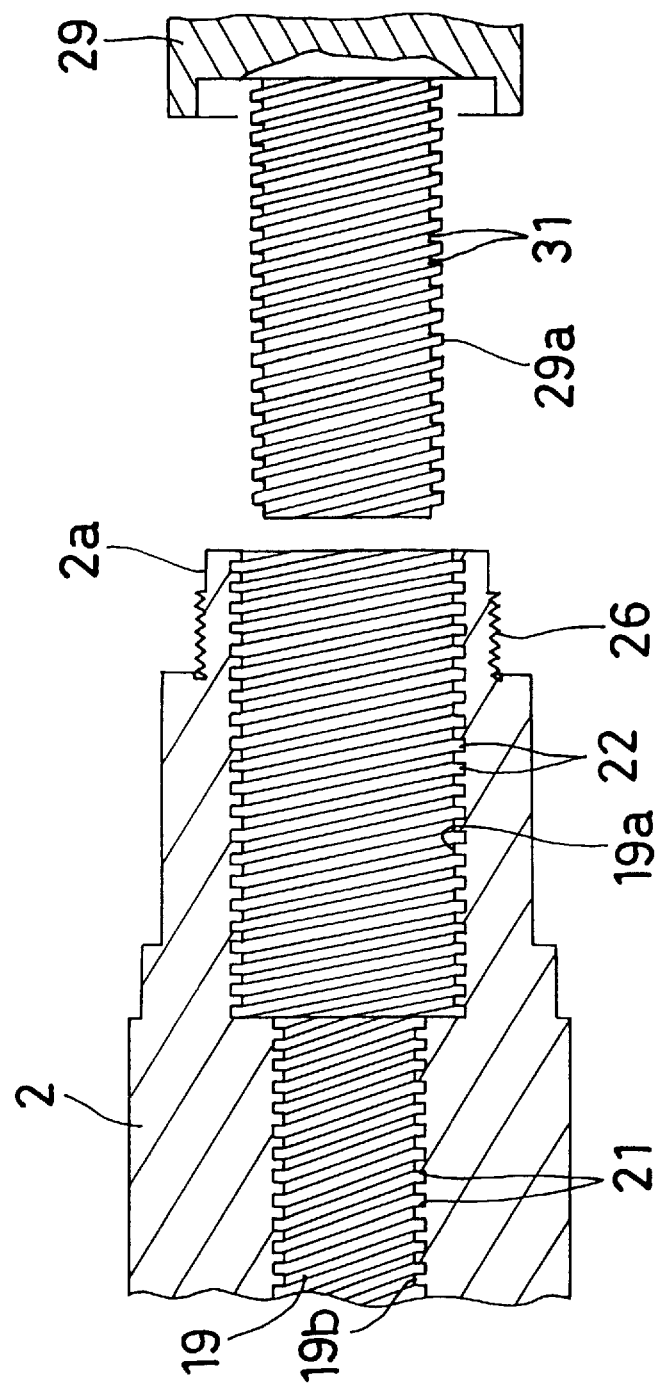
FIG. 3 is an exploded fragmentary view of FIG. 1.

FIG. 1 shows the overall construction of a magnetic bearing spindle device according to the invention, and FIGS. 2 and 3 show the construction of the main portion thereof.

With reference to FIG. 1, the magnetic bearing spindle device comprises as arranged within a housing 1 a spindle 2, motor 3, radial magnetic bearings 4, an axial magnetic bearing 5, radial sensors 6, an axial sensor 7, touchdown bearings 8, 9, etc. as is already known.

The radial magnetic bearings 4 are disposed between the housing 1 and the spindle 2 at respective two locations spaced apart axially of the spindle 2. The axial magnetic bearing 5 is disposed between the housing 1 and an outer flange 41 fixedly provided on the spindle 2. The radial magnetic bearings 4, the axial magnetic bearing 5, two radial sensors 6 for detecting the radial position of the spindle 2 and the axial sensor 7 for detecting the axial position of the spindle 2 are connected to a magnetic bearing control circuit 40 for supplying current to the radial magnetic bearings 4 and the axial magnetic bearing 5 based on position signals from the radial sensors 6 and the axial sensor 7. The axial magnetic bearing 5, the motor 3 for drivingly rotating the spindle 2 and the axial sensor 7 are arranged between the two radial magnetic bearings 4. The two radial sensors 6 are arranged outwardly of the two radial magnetic bearings 4 with respect to the axial direction of the spindle 2. The touchdown bearings 8, 9 are arranged outward of the two radial magnetic bearings 4 and the radial sensors 6 with respect to the axial direction of the spindle 2.

The front end of the spindle 2 extends outward through the front end of the housing 1 and is adapted to carry a tool thereon. When in rotation, the spindle 2 is contactlessly supported by the radial magnetic bearings 4 and the axial magnetic bearing 5 relative to the housing 1. When initiated into rotation and when brought to a halt, the spindle 2 is supported by the touchdown bearings 8, 9 of the mechanical type in contact therewith.

The housing 1 comprises a main component 11 in the form of a hollow cylinder, an annular front component 12 fixed to the front end of the main component 11, an annular rear component 13 fixed to the rear end of the main component 11, an annular front holder 14 fixed to the front face of the front component 12 for fixing the front touchdown bearing 8 along with the front component 12, an annular rear holder 15 fixed to the rear face of the rear component 13 for fixing the rear touchdown bearing 9 along with the rear component 13, and a closure plate 16 fixed to the rear face of the rear holder 15 and closing the rear end of the housing 1. The rear end of the housing 1 is covered with a cover 17 fixed to the main component 11. Indicated at 18 is a cooling fluid passage formed in the housing 1 and the cover 17.

With reference to FIGS. 1 to 3, a cooling-working fluid channel 19 extends through the spindle 2 axially thereof. The fluid channel 19 has a rear end large-diameter portion 19a. The channel 19 has a small-diameter portion 19b positioned forward of the large-diameter portion 19a and having a rear end part, which is formed over a predetermined length with at least one, e.g., two, helical grooves 21 for sending a cooling-working fluid forward when the spindle 2 is in rotation. For example, when the spindle 2 rotates clockwise (rightward) as it is seen from the rear forward, the helical grooves 21 are twisted leftward. The inner peripheral surface of the spindle 2 defining the large-diameter portion 19a is also formed with at least one, e.g., two, helical grooves 22 for forwarding the cooling-working fluid when the spindle 2 is in rotation. The helical grooves 22 are twisted in the same direction as the helical grooves 21 of the small-diameter portion 19b. The fluid channel 19 has at its front end part a flaring portion 19c and a large-diameter portion 19d. The inner peripheral portions of the spindle defining the front large-diameter portion 19d and the front end of the small-diameter portion 19b are threaded as at 23, 24, respectively, for fixing the tool. An inner peripheral portion of the spindle to the rear of the rear internally threaded portion 24 is formed with helical grooves 25 similar to the helical grooves 21 for forwarding the cooling-working fluid.

As shown in FIG. 2, the spindle 2 has a rear end small-diameter portion 2a having a rear part which is externally threaded to provide a screw 26. The small-diameter portion 2a has a rear end projecting rearward through a hole 15a formed in the rear holder 15. A ring 27 is screw on the screw 26 of small-diameter portion 2a of the spindle 2 through the hole 15a from behind the rear holder 15. A labyrinth seal 28 is provided between the ring 27 and the rear holder 15 over the entire circumference of the ring.

A tubular cooling-working fluid supply member 29 extends through the cover 17 from behind the cover 17 and is inserted fluid-tightly through the closure plate 16 into the housing 1 and secured to the cover 17 and the closure plate 16. The fluid supply member 29 has a front end small-diameter portion 29a, which is inserted in the large-diameter portion 19a of fluid channel 19 of the spindle 2 with a clearance formed therebetween. The radial spacing L between the inner peripheral surface of the spindle 2 defining the large-diameter portion 19a of the fluid channel 19 and the outer peripheral surface of small-diameter portion 29a of the fluid supply member 29 is greater than the radial spacing 1 between the spindle 2 and the touchdown magnetic bearings 8, 9 when the spindle 2 is contactlessly supported by the radial magnetic bearings 4 and the axial magnetic bearing 5. At least one, e.g., two, helical grooves 31 different in twisting direction from the helical grooves 22 formed in the inner peripheral surface of the spindle 2 defining the large-diameter portion 19a of the fluid channel 19 are formed in the outer peripheral surface of small-diameter portion 29a of the fluid supply member 29.

An annular working fluid reservoir 32 communicating with the clearance between the spindle 2 and the fluid supply member 29 is formed in the rear end interior portion of the housing 1, i.e., in the portion defined by the rear holder 15, closure plate 16, ring 27 and fluid supply member 29. The labyrinth seal 28 is provided at the portion between the reservoir 32 and an interior portion of the housing 1 forward of the rear holder 15. The rear holder 15 is formed with a plurality of drain ports 33 communicating with the fluid reservoir 32 and spaced apart circumferentially of the holder. A cooling-working fluid withdrawing member 34 extending from outside through the peripheral wall of the cover 17 has one end fixedly inserted in each drain port 33. Connected to the fluid withdrawing member 34 is a suction pipe 36 extending from a suction device 35.

When the spindle 2 supported contactlessly by the radial magnetic bearings 4 and the axial magnetic bearing 5 is rotated by the motor 3 for the operation of the magnetic bearing spindle device thus constructed, the cooling-working fluid sent into the fluid channel 19 of the spindle 2 through the fluid supply member 29 is forwarded through the channel 19 and forced out from the tool against the workpiece. At this time, the fluid is sent forward and inhibited from flowing rearward by the action of the helical grooves 21 formed in the spindle inner peripheral surface defining the rear end part of small-diameter portion 19b of the fluid channel 19. Even if the fluid flows rearward into the clearance within the large-diameter portion 19a of the fluid channel 19 around the small-diameter portion 29a of the fluid supply member 29, the helical grooves 22 formed in the inner peripheral surface defining the large-diameter portion 19a of the fluid channel 19 and the helical grooves 31 formed in the outer peripheral surface of small-diameter portion 29a of the fluid supply member 29 act to send the cooling-working fluid forward and inhibit the fluid from flowing rearward, consequently impeding rearward leakage of the fluid through the clearance between the spindle 2 and the fluid supply member 29.

Should the fluid leak rearward through the clearance between the spindle 2 and the member 29, the fluid is collected in the reservoir 32 and drawn off through the drain port 33, suction member 34 and suction pipe 36 by the suction device 35 for removal.

Further the labyrinth seal 28 acts to prevent the fluid within the reservoir 32 from ingressing into the interior portion of the housing 1 to the front of the rear holder 15. The centrifugal force resulting from the rotation of the ring 27 inhibits the fluid within the reservoir 32 from flowing toward the labyrinth seal 28. Consequently, the motor 3, radial magnetic bearings 4, axial magnetic bearing 5, radial sensors 6 and axial sensor 7 are prevented from receiving damage.

Although only the rear end portion of the fluid channel 19 is formed with the helical grooves 21 according to the foregoing embodiment, the grooves may be formed over the entire axial length of the fluid channel 19. The cooling-working fluid can then be sent forward more reliably.

INDUSTRIAL APPLICABILITY

The magnetic bearing spindle device of the invention is suitable for use as a machine tool.

We claim:
1. A magnetic bearing spindle device, comprising:
   a) a housing;
   b) a spindle, disposed within the housing, and having an inner peripheral surface surrounding a cooling fluid channel that extends axially through the spindle;
   c) a tubular cooling fluid supply member, fixed to a rear end of the housing, inserted in the spindle's cooling fluid channel to an insertion depth, and having an outer peripheral surface defining a radial clearance, with respect to the spindle's inner peripheral surface, that defines the cooling fluid channel;
   d) magnetic bearings that contactlessly support the spindle relative to the housing while the spindle is rotating; and
   e) mechanical touchdown bearings that support the spindle while the spindle is initiated into rotation and when the spindle is stopped from rotating;
   wherein (1) the radial clearance defining the cooling fluid channel is greater than (2) a radial spacing between the touchdown bearings and the spindle when the spindle is contactlessly supported.
2. The device of claim 1, wherein:
   the spindle's inner peripheral surface is formed with a helical groove that sends cooling fluid forward when the spindle is rotating.
3. The device of claim 1, wherein the housing includes:
   a fluid reservoir that is in communication with the radial clearance between the fluid supply member and the spindle; and a drain port that is in communication with the fluid reservoir.

4. The device of claim 3, further comprising:

seal means, formed between the housing and the spindle, for providing a seal between the fluid reservoir and a portion to the front of the fluid reservoir.

5. The device of claim 4, wherein:

the seal means is a labyrinth seal that is formed between the housing and the spindle.

6. The device of claim 1, wherein:

the spindle's inner peripheral surface is formed with a helical groove that sends cooling fluid forward when the spindle is rotating, the helical groove extending from a rear end of the spindle over a range that is greater than the insertion depth of the fluid supply member into the spindle's fluid supply channel.

7. The device of claim 1, wherein:

the spindle's inner peripheral surface is formed with a first helical groove that sends the cooling fluid forward when the spindle is rotation, the first helical groove having a first twisting direction; and the outer peripheral surface of a portion of the fluid supply member that is inserted into the fluid channel is formed with a second helical groove that has a second twisting direction that differs from the first twisting direction.

8. The device of claim 1, wherein the magnetic bearings include:

radial magnetic bearings that are disposed between the housing and the spindle at two locations spaced apart axially on the spindle;

an axial magnetic bearing disposed between the housing and an outer flange of the spindle;

radial sensors that detect a radial position of the spindle and provide first position-detecting signals;

an axial sensor that detects an axial position of the spindle and provides second position-detecting signals; and a magnetic bearing control circuit that supplies current to the radial magnetic bearings and the axial magnetic bearing based on the first and second position-detecting signals.

9. The device of claim 8, wherein:

the device further comprises a motor that rotates the spindle; and the axial magnetic bearing and the motor are arranged between the two radial magnetic bearings.

10. The device of claim 8, wherein:

the radial magnetic bearings are arranged between the mechanical touchdown bearings in the spindle's axial direction.

11. A magnetic bearing spindle device, comprising:

a) a housing including:

a1) a fluid reservoir that is in communication with the radial clearance between the fluid supply member and the spindle; and a2) a drain port that is in communication with the fluid reservoir;

b) a spindle, disposed within the housing, and having an inner peripheral surface surrounding a cooling fluid channel that extends axially through the spindle;

c) a tubular cooling fluid supply member, fixed to a rear end of the housing, inserted in the spindle's cooling fluid channel to an insertion depth, and having an outer peripheral surface defining a radial clearance, with respect to the spindle's inner peripheral surface, that defines the cooling fluid channel;

d) magnetic bearings that contactlessly support the spindle relative to the housing while the spindle is rotating; and e) mechanical touchdown bearings that support the spindle while the spindle is initiated into rotation and when the spindle is stopped from rotating.

12. The device of claim 11, further comprising:

seal means, formed between the housing and the spindle, for providing a seal between the fluid reservoir and a portion to the front of the fluid reservoir.

13. The device of claim 12, wherein:

the seal means is a labyrinth seal that is formed between the housing and the spindle.

14. A magnetic bearing spindle device, comprising:

a) a housing;

b) a spindle, disposed within the housing, and having an inner peripheral surface surrounding a cooling fluid channel that extends axially through the spindle;

c) a tubular cooling fluid supply member, fixed to a rear end of the housing, inserted in the spindle's cooling fluid channel to an insertion depth, and having an outer peripheral surface defining a radial clearance, with respect to the spindle's inner peripheral surface, that defines the cooling fluid channel;

d) magnetic bearings that contactlessly support the spindle relative to the housing while the spindle is rotating; and e) mechanical touchdown bearings that support the spindle while the spindle is initiated into rotation and when the spindle is stopped from rotating;

wherein:

the spindle's inner peripheral surface is formed with a first helical groove that sends the cooling fluid forward when the spindle is rotation, the first helical groove having a first twisting direction; and the outer peripheral surface of a portion of the fluid supply member that is inserted into the fluid channel is formed with a second helical groove that has a second twisting direction that differs from the first twisting direction.

* * * * *